United States Patent

Manger

[15] 3,656,825
[45] Apr. 18, 1972

[54] ROLLER BEARINGS
[72] Inventor: Werner Manger, Schweinfurt, Germany
[73] Assignee: SKF Kugellagerfabriken GmbH, Schweinfurt, Germany
[22] Filed: July 24, 1970
[21] Appl. No.: 57,972

[30] Foreign Application Priority Data

Aug. 1, 1969 Germany.....................G 69 30 530.2

[52] U.S. Cl..................................................308/213
[51] Int. Cl..........................................F16c 33/60
[58] Field of Search....................308/212, 196, 213, 214

[56] References Cited

UNITED STATES PATENTS

| | | | |
|---|---|---|---|
| 1,338,939 | 5/1920 | Laycock | 308/213 |
| 1,803,591 | 5/1931 | Bott | 308/196 |
| 2,057,102 | 10/1936 | Lemell | 308/212 |
| 2,625,450 | 1/1953 | Ringsmith | 308/213 |

*Primary Examiner*—Edgar W. Geoghegan
*Assistant Examiner*—Frank Susko
*Attorney*—Richard Low and Murray Schaffer

[57] ABSTRACT

A roller bearing having an inner and outer race and a plurality of rollers located therebetween. One of the races is provided with a separable retaining shoulder. Connecting means comprising a cap extends over the shoulder and engages a circumferential groove provided in the periphery of the ring to thereby secure the shoulder thereto.

6 Claims, 1 Drawing Figure

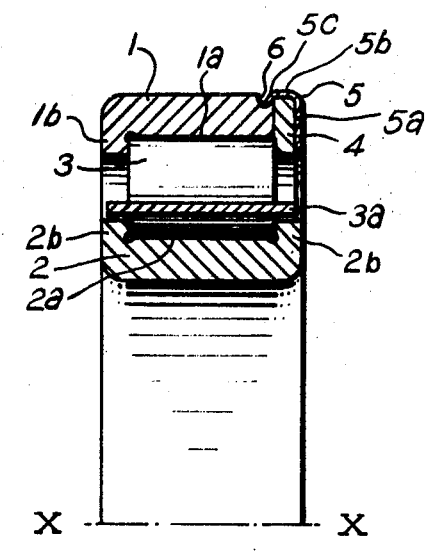
INVENTOR.
WERNER MANGER 3,656,825

ROLLER BEARINGS

BACKGROUND OF INVENTION

The present invention relates to roller bearings and in particular to a method and structure for securing the removable retaining shoulder on to the inner or outer ring.

Conventional roller bearings, employed to absorb both axial and radial forces, comprise an inner and outer annular ring having race surfaces between which cylindrical rollers, needle rollers or similar bearing rollers are inserted. The rings are provided with inwardly directed annular shoulders to normally retain the rollers between the races, except that to facilitate the assembly of rollers between the races one of the rings has only one shoulder. An annular retaining member or flange in the form of a separable shoulder is provided which abuts the end of the race to take the place of the missing shoulder. Depending on the particular structure desired, the loose annular retaining shoulder may either be on the inner or outer ring.

In an effort to construct bearings of this type as a complete unit, several expedients have been attempted to fix or secure the removable retainer. The unitary construction is of particular importance when the bearing is not capable of holding itself together, during installation of afterward or where it would normally tend to break apart or become prematurely disassembled. In U.S. Pat. No. 1,200,445 an arrangement is described wherein an annular retaining member is inserted directly in a groove formed in the outer ring after which the material of the outer ring is rolled over or distorted to secure the rim. This expedient is disadvantageous since the the requirement to form a precise groove for receiving the retaining member, and then working the metal to upset it or roll it, makes the manufacture and assembly of the bearing a complex and costly affair.

In German patent application S 18 939X/39a (published on 24 Nov. 1955) shows a second expedient in which two metallic parts such as the ring and retaining member, are interconnected by a synthetic material which is cast or molded in fluid or plastic condition. The metallic parts are provided with recesses or spaces in which the synthetic material is received. This method of manufacture is particularly expensive because it requires many steps to prepare the rings and retaining member with the recesses, to prepare the synthetic material and to properly cast or mold the material.

Still another expedient is shown in German Utility model Pat. No. 1,948,986 wherein the retaining member and ring are interconnected by a deformable annular bridge member of copper, brass or synthetic resin which is positioned in a groove formed in each of the parts. This construction too has the disadvantage of requiring working of both race ring and the retaining member to form grooves therein and also to preform and work the deformable ring.

It is the object of the present invention to provide a roller bearing in which the disadvantages of the prior art are overcome.

It is the object of the present invention to provide an improved method for employing a removable shoulder for retaining the rollers of a roller bearing.

It is another object to provide a means for securing the retaining should and race ring in a roller bearing which is easy to manufacture and requires little work to assemble.

It is yet another object to provide an inexpensive and simple connection between the retaining shoulder and the bearing race.

These and other objects and numerous advantages will be seen from the following disclosure of the present invention.

SUMMARY OF INVENTION

In accordance with the present invention a roller bearing is provided having an inner and outer ring in which race surfaces are formed for retaining a plurality of rollers. The races and rollers are conformingly made for any of the cylindrical, conical barrel or other roller types. At least one of the rings is provided with a free or separable roller retaining shoulder and a cap extending over the separable shoulder and having a peripheral edge engaging the ring to thereby connect the should to the ring.

In the preferred form the race ring is provided with a circumferential groove in its outer periphery into which the edge of the cap is inserted. Preferably the cap is made of deformable sheet metal which can be rolled or bent into shape over the bearing or which can be preformed of resilient material to be snapped thereon.

Full details of the present invention follow herein.

BRIEF DESCRIPTION OF DRAWING

The following disclosure refers to the accompanying drawing in which is shown a partial view of a roller bearing, sectioned along a plane passing through the bearing axis. Only the upper half of the bearing is shown since it is well known, to those skilled in this art, that such bearings are symmetrically about the bearing axis. Only so much of the bearing as is necessary to a full understanding of the present invention is shown, additional general details being easily obtainable from the aforementioned patents or others too numerous to mention here.

DESCRIPTION

Turning, specifically, to the figure of the drawing there is shown a roller bearing comprising an outer ring 1, an inner ring 2 and a plurality (only one is seen) of cylindrical rollers 3. The inner and outer rings are provided with opposed race surfaces 1a and 2a respectively, on which the rollers 3 ride. The outer ring 1 is provided at only one end with an inwardly directed fixed shoulder 1b while the inner ring 2 is provided with inwardly directed fixed shoulders 2b at each of its ends. A roller cage 3a of conventional design is provided to hold the rollers spaced from each other and in parallel alignment, about bearing axis X.

As described so far, the bearing is conventional in structure. It is also representative of other types of bearings, such as the needle bearing, the conically tapered bearing, the barrel bearing and even the ball bearing, which employ, of course, different forms of rollers with conformingly contoured race surfaces in the inner and outer ring. The bearing is assembled easily by placing the rollers 3 and cage 3a in a sub-assembly onto the race surface 2a of the inner ring and slipping the outer ring 1 thereover.

According to the present invention the rollers are retained by a loose, removable or separable shoulder member 4, formed like a flat annular washer, placed against the axial face of the outer ring 1 opposite to the fixed shoulder 1b. The removable shoulder 4 has a uniform dimension between its radially inner edge and outer peripheral edge which approximates the dimension of the fixed shoulder 1b so as to form a flange like portion overlying the end of the roller 3 preventing it from axial movement. The exact dimension of the separable shoulder 4 is not critical and can be chosen to suit the form of the bearing and its ultimate application.

The separable shoulder 4 is connected to the outer ring 1 by a cap 5 which comprises a flat annular disk of sheet material having a radially extending portion 5a overlying the axial outer face of the separable shoulder 4 and an axially extending portion 5b overlying the radial peripheral edge of the retaining member 4. The cap 5 further has a reversely bent peripheral edge 5c which lies in a circumferential groove or cut down portion 6 formed in the axial peripheral edge or corner of the outer ring 1.

Preferably the cap 5 is provided in the form of a flat annular disk of deformable sheet metal, placed over the face of the retaining member 4 which thereafter, has its periphery bent over, as by rolling, until its peripheral edge 5c enters the groove 6. The cap 5 may also be provided in a preformed shape of resilient metal which will permit it to be snapped over the retaining member 4 with its edge 5c securely lodging in groove 6 without further working or rolling. The use of synthetic plastic of either the thermosetting or thermoplastic types, will also be obvious as substitutes for metal in either of the above forms.

As seen in the figure, the separable shoulder 4 is dimensioned to be smaller by an amount equal to the thickness of the cap 5, so that when the cap is secured in place, the overall dimension of the bearing is not enlarged. While this, too, is the preferred form it may be varied or modified as desired.

The circumferential groove 6 in the outer ring may be of any size which would conventionally accommodate the peripheral edge 5c of the cap. While it, too, is shown in the preferred form adjacent to the edge or corner of the ring 1, it may be moved axially inwardly, if desired. It may even take the shape of a V since its exact form is not critical. Additionally a discontinuous groove or series of recesses may be provided on the ring in place of the continuous groove 6, and the edge 5c, staked or selectively turned over rather than being continuously rolled.

It will be obvious that the separable shoulder 4 may be provided on the inner race ring rather than the outer ring and the connecting cap adapted to secure the member about the inner diameter of the bearing. It will also be obvious that both the inner and outer rings may be provided with separable members, if desired.

It will thus be seen that the present invention provides a simple, inexpensive retaining shoulder, which may be easily removed. The present invention provides, at the same time, simple and inexpensive connecting means for securing the removable shoulder to either or both of the race rings.

The advantage of the present invention resides in the face that the race rings do not require excessive or complex preforming or preworking in order that it may receive the connecting cap. Likewise the cap does not require complicated preforming and may even be supplied as a simple annular flat ring or disk. On the other hand when the preformed snap on cap is provided, special tools are not needed to assemble the bearing.

Since many changes, modifications and embodiments have been described and suggested, the present disclosure is intended as illustrative only of the invention and not, in any manner limiting.

What is claimed:

1. A roller bearing comprising an inner and outer ring each having a cylindrical race surface formed thereon, a plurality of cylindrical rollers axially coextensive with said race surfaces arranged therebetween, one of said rings having inwardly directed shoulders at each of the axial edges of said race surfaces, the other of said rings having an inwardly directed shoulder at one of the axial edges of the race surface surfaces and an annular separable retaining shoulder adjacent to the other axial edge, said shoulder being coextensive with the corresponding inwardly directed shoulder of said one ring and a removable connecting cap extending over said separable shoulder and having a peripheral edge portion engaging with said one ring to thereby secure said separable shoulder to said other one of said rings, said shoulders bounding said race surfaces and engaging the axial ends of said cylindrical rollers to retain the same against axial movement.

2. The bearing according to claim 1, wherein said one ring is provided with a circumferential groove about its outer periphery and said connecting cap has a peripheral edge inserted therein.

3. The bearing according to claim 2, wherein said cap comprises an annular flat disk having its peripheral edge portion rolled over into said circumferential groove.

4. The bearing according to claim 2, wherein said cap is preformed, of resilient material, having a portion extending over said retaining shoulder and a terminal peripheral edge portion adapted to be snap fit into said circumferential groove.

5. The bearing according to claim 2, wherein said cap is formed of a deformable sheet metal.

6. The bearing according to claim 1, wherein said one ring is formed with a fixed shoulder opposite said separable shoulder for holding said rollers, and said separable shoulder comprises a disk simulating said shoulder and a reduced size equal to the thickness of said cap to thereby conform the assembly to the overall size of the bearing.

* * * * *